United States Patent [19]

Lee et al.

[11] Patent Number: 5,044,218

[45] Date of Patent: Sep. 3, 1991

[54] APPARATUS FOR TRANSMITTING THE TURNING FORCE OF A CAPSTAN FLYWHEEL FOR VIDEO CASSETTE RECORDERS

[75] Inventors: Jae G. Lee, Incheon; Tae W. Park, Suwon, both of Rep. of Korea

[73] Assignee: SamSung Electronics Co., Ltd., Suwon, Rep. of Korea

[21] Appl. No.: 401,855

[22] Filed: Sep. 1, 1989

[30] Foreign Application Priority Data

Sep. 1, 1988 [KR] Rep. of Korea ................ 1988-14657

[51] Int. Cl.5 ................................................ F16H 57/00

[52] U.S. Cl. ..................................... 74/421 R; 74/342; 74/405; 242/201

[58] Field of Search ..................... 74/421 R, 405, 321, 74/341, 342; 242/201; 192/21

[56] References Cited

U.S. PATENT DOCUMENTS 4,173,320 11/1979 Schatieman ..................... 242/201 X
4,260,120 4/1981 Urata et al. ......................... 242/201
4,621,535 11/1986 Bronson et al. ....................... 74/405
4,711,410 12/1987 Gwon ................................. 242/201

*Primary Examiner*—Allan D. Herrmann
*Assistant Examiner*—Andrea Pitts
*Attorney, Agent, or Firm*—Robert E. Bushnell

[57] ABSTRACT

An apparatus for transmitting the turning force of a capstan flywheel for video cassette recorders by which the turning force of the capstan flywheel driven by a capstan motor is transmitted to the reel disk selectably at high speed and low speed. The apapratus includes a slider gear provided with a clutch gear slidably mounted to a shaft and located between the capstan flywheel having a geer portion and a connector gear. The shaft is moved up and down by mean of a slider lever which is interlocked with a clutch lever pivotally mounted by a pinch lever.

8 Claims, 3 Drawing Sheets

8 7 6 4 4' 13 14 11 3' 7' 6' 5 d 12' 12 10 3" 3

1
2
2'
3
3'
4
4'
6
7
8
8'
9
9'
10
11
14
16
16"
17
18
19
20
21'
22
a
b
b'

APPARATUS FOR TRANSMITTING THE TURNING FORCE OF A CAPSTAN FLYWHEEL FOR VIDEO CASSETTE RECORDERS

BACKGROUND OF THE INVENTION

1. Field of the Invention

The present invention generally relates to a video cassette recorder, and more particularly to an apparatus for transmitting the turning force of a capstan flywheel for video cassette recorders by which the turning force of the capstan flywheel driven by a capstan motor is transmitted to the reel disk selectively at high speed and low speed.

2. Description of the Prior Art

In the conventional video cassette recorders, as the turning force of the capstan flywheel is transmitted only by a belt without any distinction between high speed rotation for fast forward (FF) or rewind (REW) mode of the tape, and low speed rotation for play mode of the tape. This type of arrangement, however, has the disadvantage that the disadvantageous slip may occurr between the belt and the wheel, so that the loss of the turning force has occurred and thereby accuracy for transmitting the turning force is reduced.

Moreover, the above disadvantageous slip exerts a harmful influence upon the peripheral system, so that in practical use, it is very difficult to maintain the performance of the apparatus.

SUMMARY OF THE INVENTION

It is an object of the present invention to provide an improvement in the apparatus of the above-described general type, such that the turning force of the capstan flywheel can be transmitted accurately by driving selectively at high speed and low speed respectively.

It is another object of the present invention to provide an improvement in the apparatus of the above type, such that when the reel disk is rotated at high speed, the turning force of the flywheel is to be rotated by way of the gear, so that the reduction of the turning force and the disadvantageous slip can be prevent.

It is still another object of the invention to provide an apparatus which is adapted to solve the difficulties on the selection of component parts by the accurate transmit of the turning force of the flywheel.

The above and other objects are achieved with an apparatus for transmitting the turning force of the capstan flywheel for video cassette recorders comprising a slider gear provided at its upper end with a clutch gear slidably mounted to a vertically moving shaft member and located between the capstan flywheel with the gear portion and a connector gear, the shaft member being moved up and down by means of a slider lever which is to be interlocked with a clutch lever pivotally mounted by a pinch lever.

BRIEF DESCRIPTION OF THE DRAWINGS

The present invention will now be described by way of illutrative examples with reference to the accompanying drawings, in which.

DETAILED DESCRIPTION OF THE PREFERRED EMBODIMENT

Figure 1:
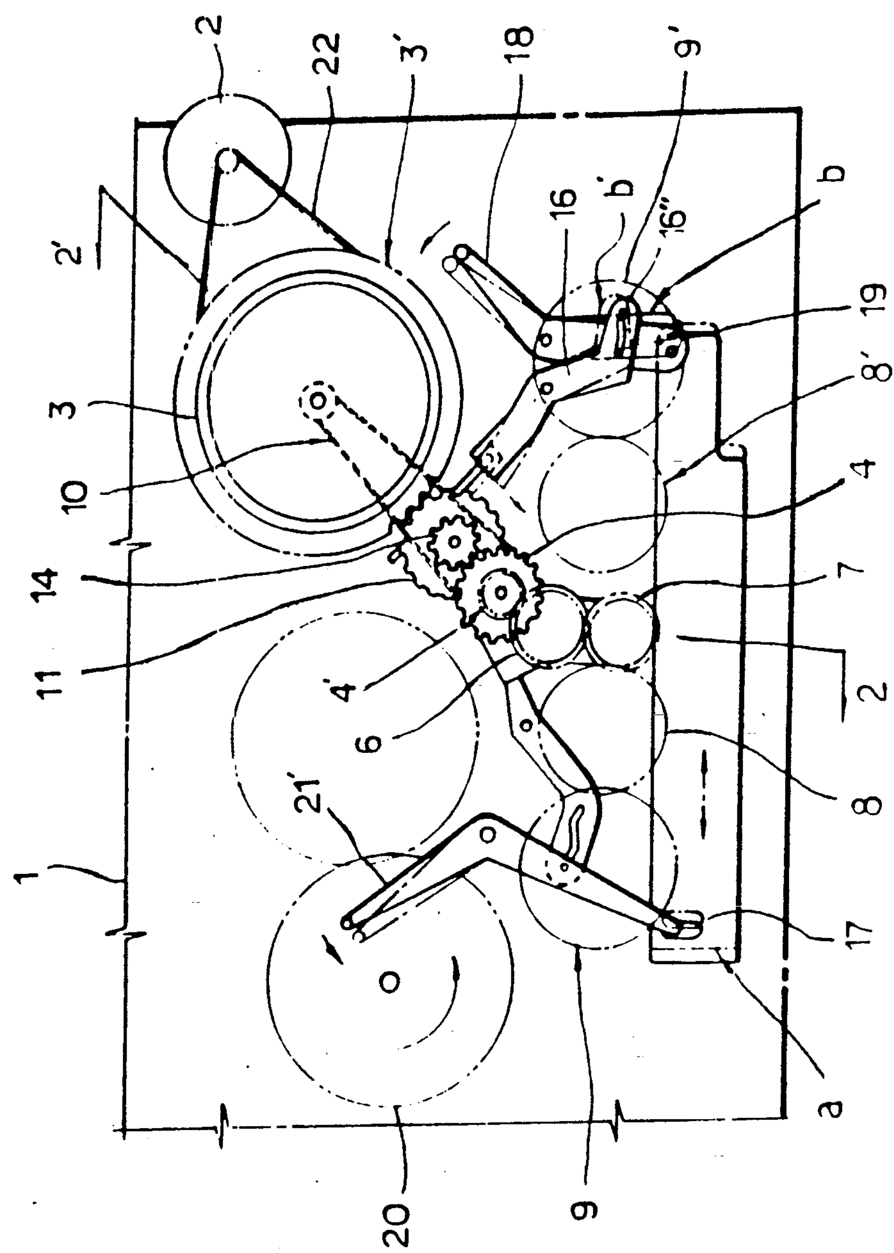
FIG. 1 is a schematic plan view showing the embodiment according to the present invention.

Referring to FIG. 1 of the drawings, a capstan flywheel 3 is attached to a shaft in a deck and connected through a belt 22 in order to be rotated by means of a capstan motor.

To begin with, the turning force of the flywheel is transmitted to fixed connector gears 4 and 4′ or to a connector wheel 5. The turning force is transmitted from the connector gears 4 and 4′ or the connector wheel 5′ via fixed idlers 6 and 6′ to rotating idlers 7 and 7′, and then transmitted to both of subreels 8 and 8′ respectively so that reel disks 9 and 9′ are rotated.

The wheel 3 is provided at its upper end with a gear portion 3′ while at its lower end with a pulley 3″ for fitting the idler belt.

A slider gear 11 is formed between the wheel 3 and the connector gears 4 and 4′, and mounted slidably to a shaft 13 which is moved up and down by means of a slider lever 12 in order that the slider gear 11 and the slider lever 12 are moved up and down.

On the upper axial side of the slider gear 11, there is provided a clutch gear which is elastically connected to the slider gear by means of an elastic spring, the clutch gear 14 being slidably mounted to the shaft 13 to engage the connector gear 4, so that the gears 11 and 14 are rotated together.

By means of the slider lever 12, a lever pin 12′ engages with one end of a clutch lever 16 to be interlocked by the latter, the lever 16 being connected with an interlock pin via an elongated hole 16″ to enable rotation by a pinch lever 18 which is mounted in the deck 1, so that while a mode slider 17 is moved, the lever can be rotated.

Figure 2:
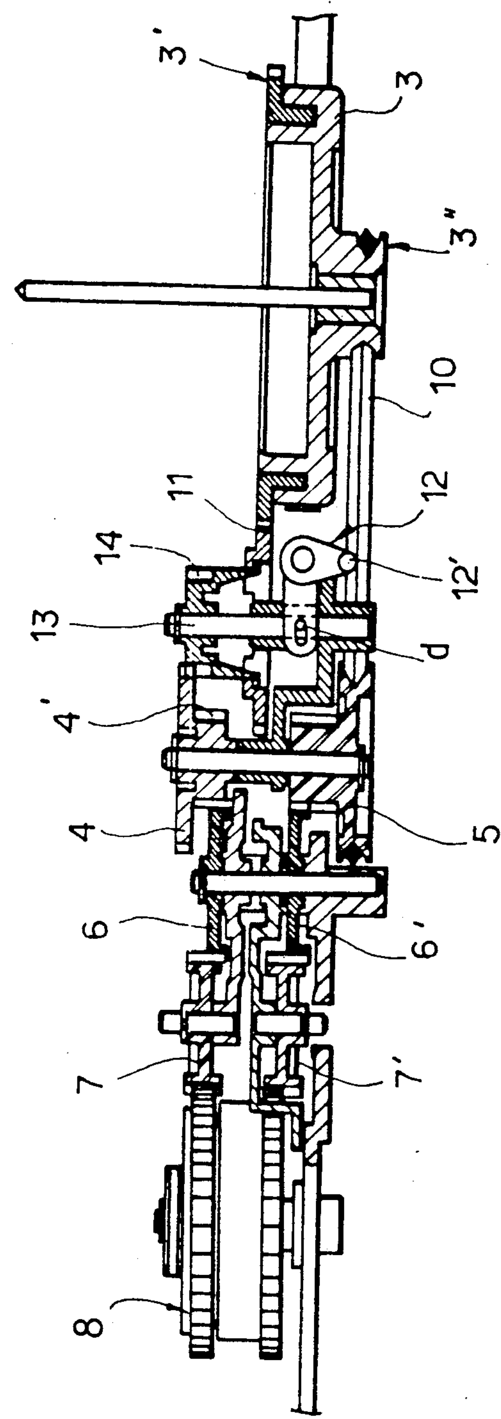
FIG. 2 is a fragmentary sectional view taken along line A—A of FIG. 1.
Figures 3A, 3B:
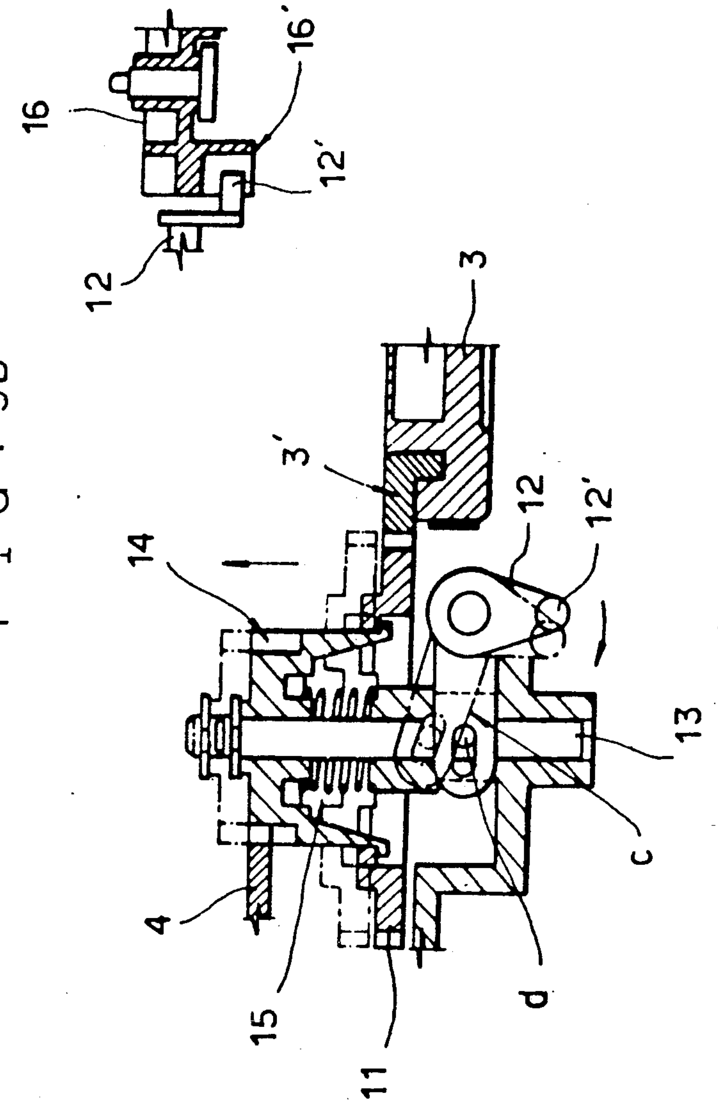
FIG. 3A is a partially cutway view of the gear portion in the embodiment of FIG. 1.
FIG. 3B is a schematic view of the portion for connecting the slider lever with the clutch lever of FIG. 1.

In the embodiment as described above, since the connector gears 4 and 4′ and the upper and lower fixed idlers 6 and 6′ are attached slidably to the shaft and are to be ratated respectively. When the reel disk is intended to be rotated at high speed for fast forward (FF) and rewind (REW) modes of the tape, the slider gear 11 is lowered and engaged with the gear portion 3′ as shown in FIG. 2 and FIG. 3A.

At this moment, as the upper clutch gear is formed to be widened in its upper and lower width, the turning force of the wheel 13, which is rotated at high speed by means of the capstan motor 2, is transmitted to the connector gear 4 via the clutch gear 14 which is connected to the slider gear 11 by way of the gear portion 3′ and the slider gear 11, whereby the turning force is transmitted to the upper fixed idler 6 by means of the connector gear 4′ fixed therewith and thus rotates the upper rotating idler 7.

Accordingly, the rotating idler 7 is selectively contacted and engaged with the subreels 8 and 8′.

More specifically, the rotating idler 7 engages with the subreel 8 during the rewind mode of the tape, while engages with the subreel 8′ during the fast forward mode, so that the corresponding reel disks 9 and 9′ are selectively rotated at high speed.

On the other hand, during the play mode of the tape, it is necessary to rotate the reel disk 9′ at low speed. At this time, a cam lever 21′ is rotated along the curved cam groove while the cam lever 21′ is rotated counterclockwise, and thereby the mode slider 17 can be moved toward the right hand as the phantom line shown in FIG. 1.

In this manner, since the pinch lever 18 and the clutch lever 16 are rotated in turns as the phantom lines b and b' shown in FIG. 1, one end 16' of the clutch lever 16 pushes the lever pin 12' along the arrow as shown in FIG. 3A.

Therefore, slider lever 12 is rotated as the phantom line C in FIG. 3, then the shaft 13 is moved upwardly by means of the shaft pin d, which is coupled with the elongated hole 16'', so that the clutch gear 14 and the slider gear 11 attached thereto are moved upwardly together, and thus the slider gear 11 is separated from the capstan wheel 3.

The reduced turning force of the capstan flywheel 3 is transmitted to the connector wheel 5 by way of the idler belt 10 provided between the pulley 3'' and the connector wheel 5, and is then applied to the gear portion 3' fixed to the connector wheel 5, causing the lower rotating idler 7' to be rotated.

Accordingly, the lower rotating idler 7' comes in contact with the subreel 8' and engages therewith while rotating in accordance with its rotating direction so that the reel disk 9' is rotated at low speed. Thus, the play mode is proceeded normally. Furthermore, when the reel disk 9' is intended to be rotated again at high speed, the can gear 20 is reversely rotated, and thus the mode slider 17, the pinch lever 18, and the clutch lever 16 are moved inversely. Therefore, the slider gear 11 is lowered again and engaged with the gear portion 3' of the capstan flywheel 3, so that the slider gear 11 is rotated at high speed.

According to the embodiment of the present invention as described above, the slider gear provided at its upper end with the clutch gear is slidably mounted to the shaft which is moved up and down by means of the slider lever provided between the capstan flywheel and the connector gear, in order to move vertically together with the shaft and thus the turning force is transmitted by the slider gear, resulting in that a disadvantageous slip is eliminated and the turnig force can be accurately transmitted with the loss thereof prevented.

While the present invention has been described and illustrated herein with reference to the preferred embodiments thereof, it will be understood by those skilled in the art that various changes in form and details may be made therein without departing from the spirit and scope of the invention.

What is claimed is:

1. An apparatus for transmitting the turning force of a capstan flywheel for a video cassette recorder, comprising:

a slider gear provided at its upper axial side with a clutch gear and slidably mounted on a vertically moving shaft member, said slider gear being located between a gear portion of said capstan flywheel and connector gears of the video cassette recorder, said shaft member being movable up and down by means of a slider lever interlocked with a clutch lever pivotally mounted by means of a pinch lever.

2. The apparatus as set forth in claim 1, wherein said clutch gear is elastically connected to said slider gear, said clutch gear being slidably mounted to the shaft member to engage one of said connector gears so that said slider gear and said clutch gear can be rotated together.

3. The apparatus as set forth in claim 2, further comprising:

a mode slider for rotating said pinch lever in a direction according to a desired mode of operation of said video cassette recorder;

wherein said slider lever includes a lever pin for interlocking said slider lever to said clutch lever; and said clutch lever includes an elongated hole to enable said clutch lever and said pinch lever to be interlocked by means of an interlocking pin thereby enabling said pinch lever to be rotated by said slider.

4. The apparatus as set forth in claim 3, further comprising:

a connector wheel connected to said flywheel by a idler belt;

an upper fixed idler connected to one of said connector gears;

a lower fixed idler connected to said connector wheel;

an upper rotating idler connected to said upper fixed idler;

a lower rotating idler connected to said lower fixed idler;

a first subreel having an upper part and a lower part;

a second subreel having an upper part and a lower part;

a first reel disk connected to said first subreel; and a second reel disk connected to said second subreel;

wherein in a first mode of operation said gear portion of said flywheel transmits the turning force of said flywheel to said first subreel via said slider gear, said clutch gear, said connector gears, said upper fixed idler and said upper rotating idler to thereby rotate said first reel disk at a first rate; and wherein in a second mode of operation said idler belt transmits the turning force of said flywheel to said second subreel via said connector wheel, said lower fixed idler and said lower rotating idler to thereby rotate said second reel disk at a second rate lower than said first rate.

5. Apparatus for transmitting a turing force of a capstan flywheel of a cassette recorder having reel disks for driving tape of a tape cassette, comprising:

a first gear train connectable by a belt to the flywheel so as to couple torque to at least one of said reel disks for moving the tape at a first rate of travel; and a second gear train selectively connectable to a toothed periphery of said flywheel so as to couple torque from the toothed periphery to at least one of said reel disks and thereby move the tape at a second rate of travel, said second rate being faster than said first rate.

6. The apparatus as claimed in claim 5, wherein said first gear train comprises:

a connector wheel coupled to said flywheel by said belt;

a fixed idler connected to said connector wheel;

a rotating idler connected to said fixed idler; and a subreel connected to said rotating idler, wherein said subreel causes reel disks of said of said recorder to turn at said first rate of travel.

7. The apparatus as claimed in claim 5, wherein said second gear train comprises:

a slider gear selectively connected to said toothed periphery of said flywheel;

a clutch gear connected to an upper axial side of said slider gear so that said slider gear and said clutch gear can be rotated together;

connector gears connectable to said clutch gear;

a fixed idler connected to said connector gears;

a rotating idler connected to said fixed idler; and a subreel connected to rotating idler, wherein said subreel causes of said reel disks of said of said recorder to turn at said second rate of travel.

8. The apparatus as claimed in claim 7, wherein said clutch gear is elastically connected to said slider gear;

said clutch gear and said slider gear being mounted on a vertically movable shaft member; and said shaft member being connected to a rotatable slider lever, wherein said slider lever causes said shaft member to be moved up or down, thereby selectively disconnecting or connecting, respectively, said slider gear to said toothed periphery of said flywheel.

* * * * *

UNITED STATES PATENT AND TRADEMARK OFFICE

CERTIFICATE OF CORRECTION

PATENT NO. : 5,044,218

DATED : September 3, 1991

INVENTOR(S) : Jae Gon LEE, et al.

It is certified that error appears in the above-identified patent and that said Letters Patent is hereby corrected as shown below:

Column 1, Line 7, delete "Field of the Invention";

Line 15, delete "Description of the Prior Art";

Line 16, delete "as";

Line 43, change "prevent" to --prevented--;

Line 46, change "transmit" to --transmittal--;

Line 61, change "illutrative" to --illustrative--;

Column 2, Line 42, change "ratated" to --rotated--;

Column 3, Line 41, change "turnig" to --turning--.

UNITED STATES PATENT AND TRADEMARK OFFICE
CERTIFICATE OF CORRECTION

PATENT NO. : 5,044,218

DATED : September 3, 1991

INVENTOR(S) : Jae Gon Lee, et. al.

It is certified that error appears in the above-identified patent and that said Letters Patent is hereby corrected as shown below:

Claim 3, Column 4, line 11, insert --mode-- after "said" (second occurrence);

Claim 4, Column 4, line 15, change "a" to --an--;

Claim 5, Column 4, line 42, change "turing" to --turning--;

Claim 7, Column 5, line 10, delete "of said" (second occurrence).

Signed and Sealed this

Twenty-ninth Day of December, 1992

*Attest:*

DOUGLAS B. COMER

*Attesting Officer* *Acting Commissioner of Patents and Trademarks*